US008117168B1

(12) United States Patent
Stringham

(10) Patent No.: US 8,117,168 B1
(45) Date of Patent: Feb. 14, 2012

(54) METHODS AND SYSTEMS FOR CREATING AND MANAGING BACKUPS USING VIRTUAL DISKS

(75) Inventor: Russell Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 295 days.

(21) Appl. No.: 12/415,278

(22) Filed: Mar. 31, 2009

(51) Int. Cl.
 *G06F 17/30* (2006.01)
(52) U.S. Cl. ............................................. 707/646; 713/2
(58) Field of Classification Search .................... 707/648
 See application file for complete search history.

(56) References Cited

U.S. PATENT DOCUMENTS

| | | | |
|---|---|---|---|
| 7,266,655 B1* | 9/2007 | Escabi et al. .................. | 711/162 |
| 7,356,679 B1* | 4/2008 | Le et al. ............................ | 713/1 |
| 2010/0049930 A1* | 2/2010 | Pershin et al. ................. | 711/162 |
| 2010/0153617 A1* | 6/2010 | Miroshnichenko et al. ...... | 711/6 |

OTHER PUBLICATIONS

"VMware Consolidated Backup Product Datasheet", Item Number: 07Q4_VM_CB3-5_DS_EN_R2, VMware, Inc. 2007, pp. 1-2.*
"VMware Converter User's Manual", Item Number: VMC-ENG-Q407-281, VMware, Inc. 2007, pp. 1-16.*
Perilli, Alessandro; "Microsoft Vista CompletePC Backup will Use Virtual Server Virtual Disk Format"; Jun. 24, 2006; http://www.virtualization.info/2006/06/microsoft-vista-completepc-backup-will.html.
"Explore the features: Windows Backup and Restore Center"; (accessed on May 14, 2009); http://www.microsoft.com/windows/windows-vista/features/backup.aspx.
Stevenson, Dan; Backup and Restore in Windows Vista and Windows Server Longhorn; http://download.microsoft.com/download/5/b/9/5b97017b-e28a-4bae-ba48-174cf47d23cd/BUS107_WH06.ppt.
"Windows Vista: A Guide to Windows Vista Backup Technologies"; (accessed May 18, 2009); http://technet.microsoft.com/en-us/magazine/2007.09.backup.aspx.
Van Rietschote; "SW virtualization (aka VMware)"; Oct. 25, 2001; Veritas.

* cited by examiner

*Primary Examiner* — Cheryl Lewis
*Assistant Examiner* — Scott A Waldron
(74) *Attorney, Agent, or Firm* — Advantedge Law Group

(57) ABSTRACT

A computer-implemented method may, at a first point in time, back up at least a portion of a data-storage entity to a first virtual-disk file. The computer-implemented method may capture, in a second virtual-disk file, at least one change made to data in the data-storage entity after the first point in time. The computer-implemented method may also create a parent-child relationship between the first virtual-disk file and the second virtual-disk file, with first virtual-disk file being a parent of the second virtual-disk file. The computer-implemented method may further copy data stored in the second virtual-disk file to the first virtual-disk file so that the first virtual-disk file includes the at least one change made to data in the data-storage entity after the first point in time. Various other methods, systems, and computer-readable media are also disclosed.

14 Claims, 6 Drawing Sheets

METHODS AND SYSTEMS FOR CREATING AND MANAGING BACKUPS USING VIRTUAL DISKS

BACKGROUND

Backup and recovery are two significant issues facing Information Technology ("IT") administrators. Whether from physical failure, human error, or a system crash, data loss is inevitable without an appropriate backup and recovery solution. IT administrators may examine their recovery point objectives ("RPO") and recovery time objectives ("RTO") when considering a proper backup and recovery solution. An IT organization may have a system that allows some data loss and only requires a backup once every day. Another system may require every change to be backed up, allowing data to be recovered from any point in time. Some non-critical systems may allow several days to recover after a failure; however, other critical systems, requiring high-availability, may require immediate failover.

Some IT organizations use physical machines for backup and recovery. A physical recovery point may need to be configured with hardware identical to a failed machine to recover data for the failed machine. Other solutions may allow recovery machines and failed machines to have different hardware, which may necessitate modifying data backed up from the failed machine to allow the data to run on the recovery machine.

Systems that need short recovery times may include a substantial amount of hardware redundancy—sometimes up to twice the number of physical machines needed for day-to-day operations. The extra machines may contain hot backups that allow a failed machine to be replaced instantly. In addition to the extra hardware costs, such disaster recovery systems may consume management resources to keep the backup machines and the production machines in sync.

IT administrators are increasingly turning to computer system virtualization to better administer and manage their infrastructures. In some cases, virtualization may reduce overall costs, including those associated with backup and recovery. Some traditional backup and recovery systems may implement virtualization by converting a backup file to a virtual-disk file to allow a virtual machine to be booted from the virtual-disk file. Unfortunately, converting backup files to virtual-disk files may consume additional data storage and may involve substantial input/output ("I/O") and processing.

SUMMARY

The instant disclosure is directed to methods and systems for creating and managing backups using virtual-disk files. Embodiments of the instant disclosure may enable an IT administrator to backup data to a virtual-disk file, capture incremental changes in an incremental virtual-disk file, and roll the incremental changes into the virtual-disk file. For example, at a first point in time, a backup module may back up data from a data-storage entity (e.g., a volume) to a first virtual-disk file. At a second point in time, the backup module may capture, in a second virtual-disk file (e.g., an incremental virtual-disk file), a change made to the data in the data-storage entity. The backup module may create a parent-child relationship linking the first and second virtual-disk files. The backup module may then copy the data from the second virtual-disk file to the first virtual-disk file so that the first virtual-disk file contains a synthetic full backup of the data from the data-storage entity as it existed at the second point in time.

In some embodiments, the first virtual-disk file may include a full backup of the data-storage entity, and the second virtual-disk file may include an incremental backup of the data-storage entity. In other embodiments, the first and second virtual-disk files may both be incremental backups of the data-storage entity. According to certain embodiments, the first and second virtual-disk files may comprise a virtual-machine-disk-format file or a virtual-hard-disk file.

In various embodiments, the backup module may create an empty virtual-disk file. The backup module may then create a parent-child relationship linking the first virtual-disk file to the empty virtual-disk file. Some embodiments may include a recovery module that may retarget the empty virtual-disk file to enable a virtual machine to boot from the first virtual-disk file. The recovery module may use the first empty virtual-disk file to boot a virtual machine from the first virtual-disk file. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
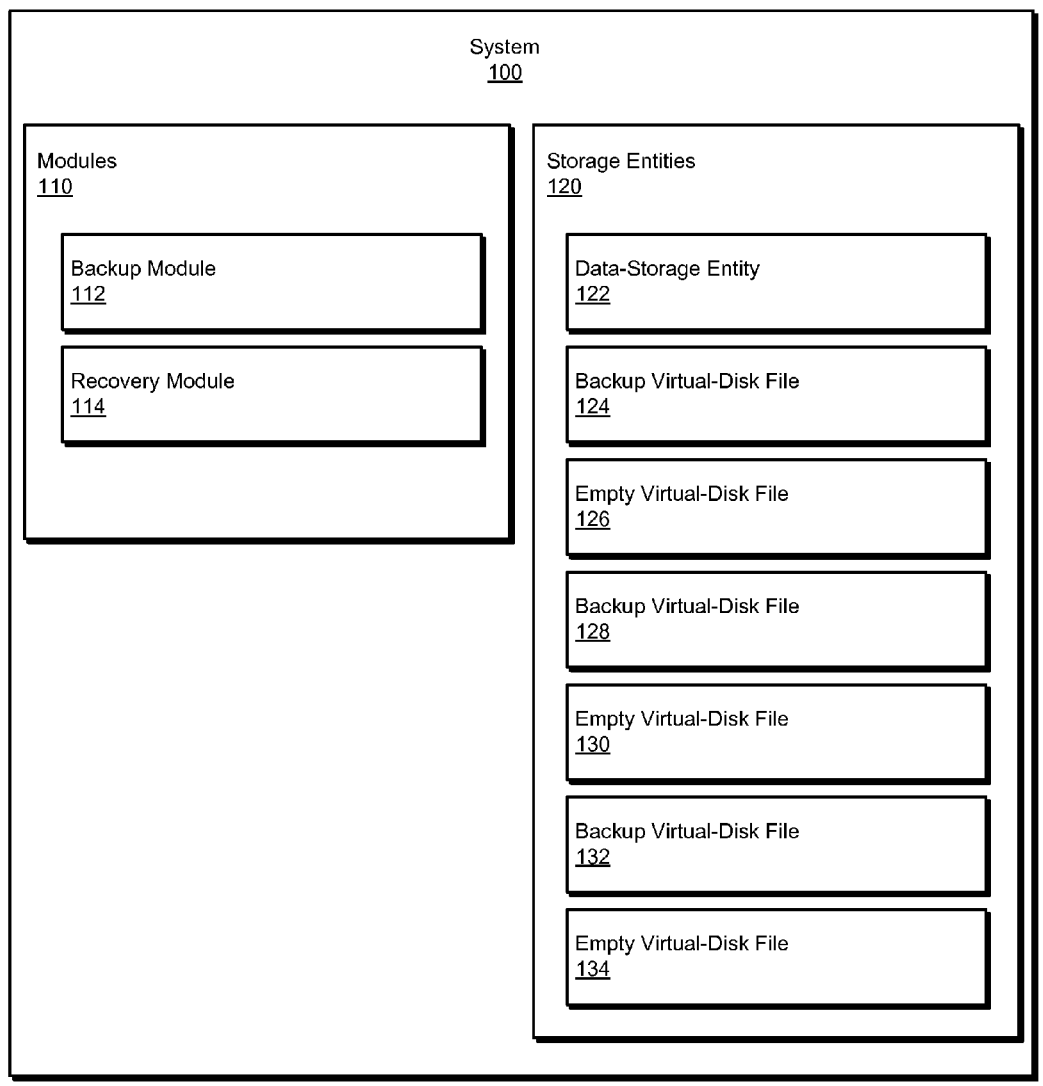
FIG. 1 is a block diagram of an exemplary system for creating and managing backups using virtual disks according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure provide methods and systems for creating and managing backups using virtual disks. For example, a backup module may backup a data-storage entity, (e.g., a full or incremental backup) to a virtual-disk file at a first point in time. Later, the backup module may capture, in a second virtual-disk file, at least one change made to data stored in the data-storage entity (e.g., an incremental backup). The backup module may then copy data from the second virtual-disk file to the first virtual-disk file so that the first virtual-disk file contains a backup that represents the data-storage entity at the later point in time. A recovery module may be programmed to use an empty virtual-disk file for retargeting and/or to use the first empty virtual-disk file to boot a virtual machine from the first virtual-disk file.

Embodiments described herein may provide one or more features and/or advantages not provided by traditional backup systems. For example, using a virtual-disk file as a backup as described herein may avoid the costly I/O, processing, and data storage involved in converting backup files to virtual-disk files. Furthermore, using a virtual-disk file as a backup may be advantageous because one or more other appliances, such as deduplication appliances, may be configured to handle virtual-disk file formats but may not be configured to handle one or more other traditional backup file formats.

Figure 2:
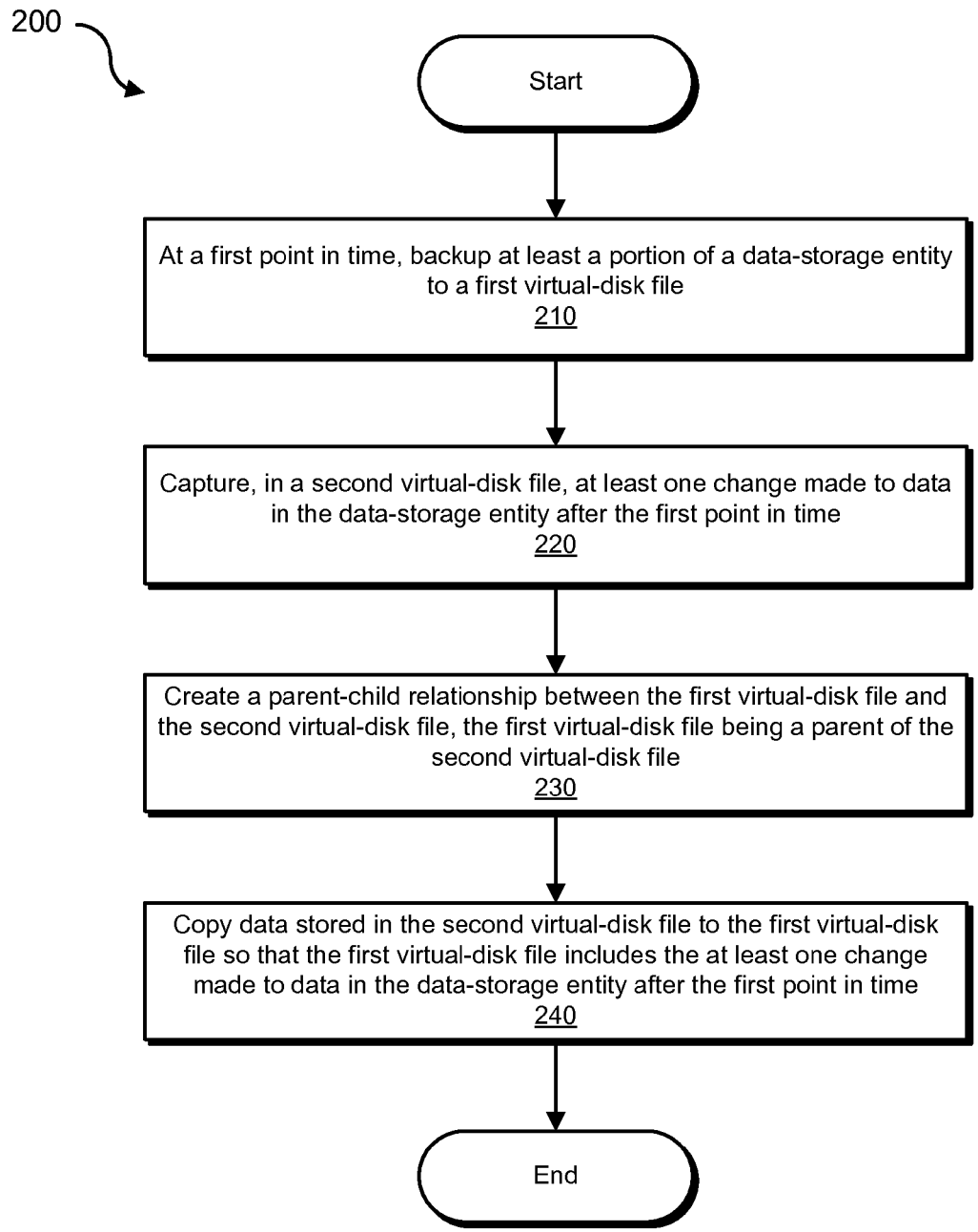
FIG. 2 is a flow diagram of an exemplary method for creating and managing backups using virtual disks according to certain embodiments.
Figure 3:
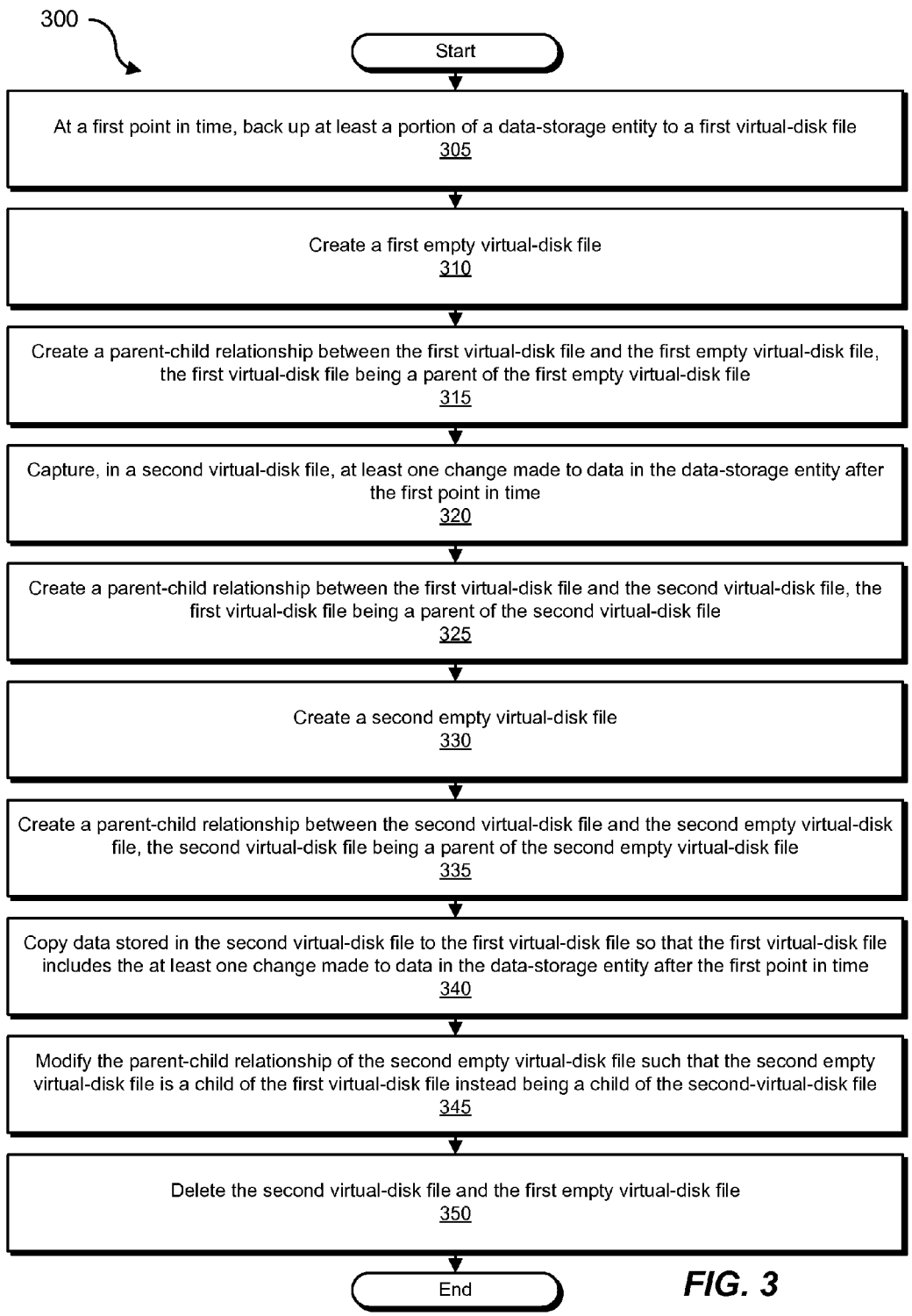
FIG. 3 is a flow diagram of another exemplary method for creating and managing backups using virtual disks according to certain embodiments.
Figure 4:
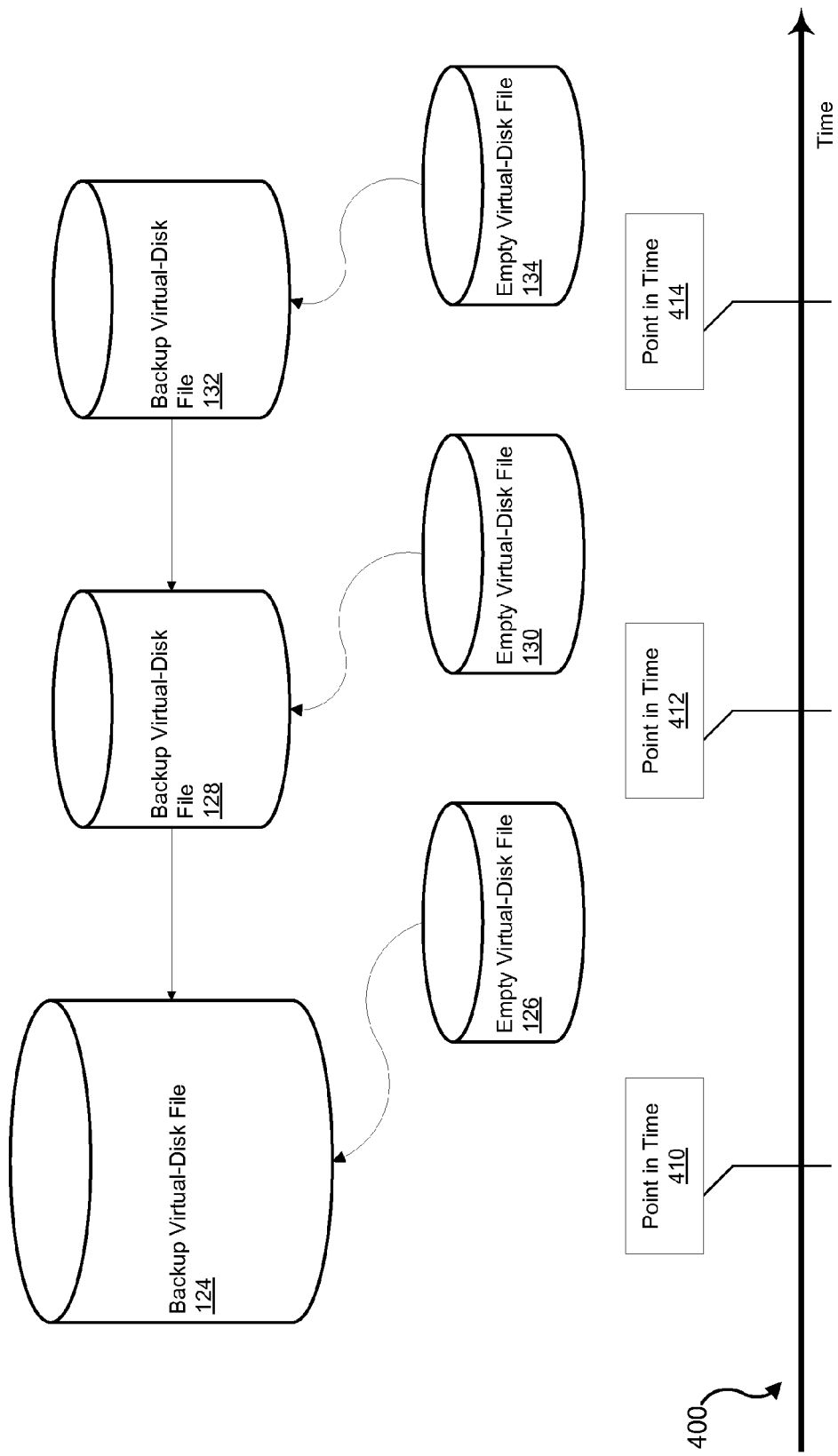
FIG. 4 is a timeline showing backup events of an exemplary system for creating and managing backups using virtual disks according to certain embodiments.
Figure 5:
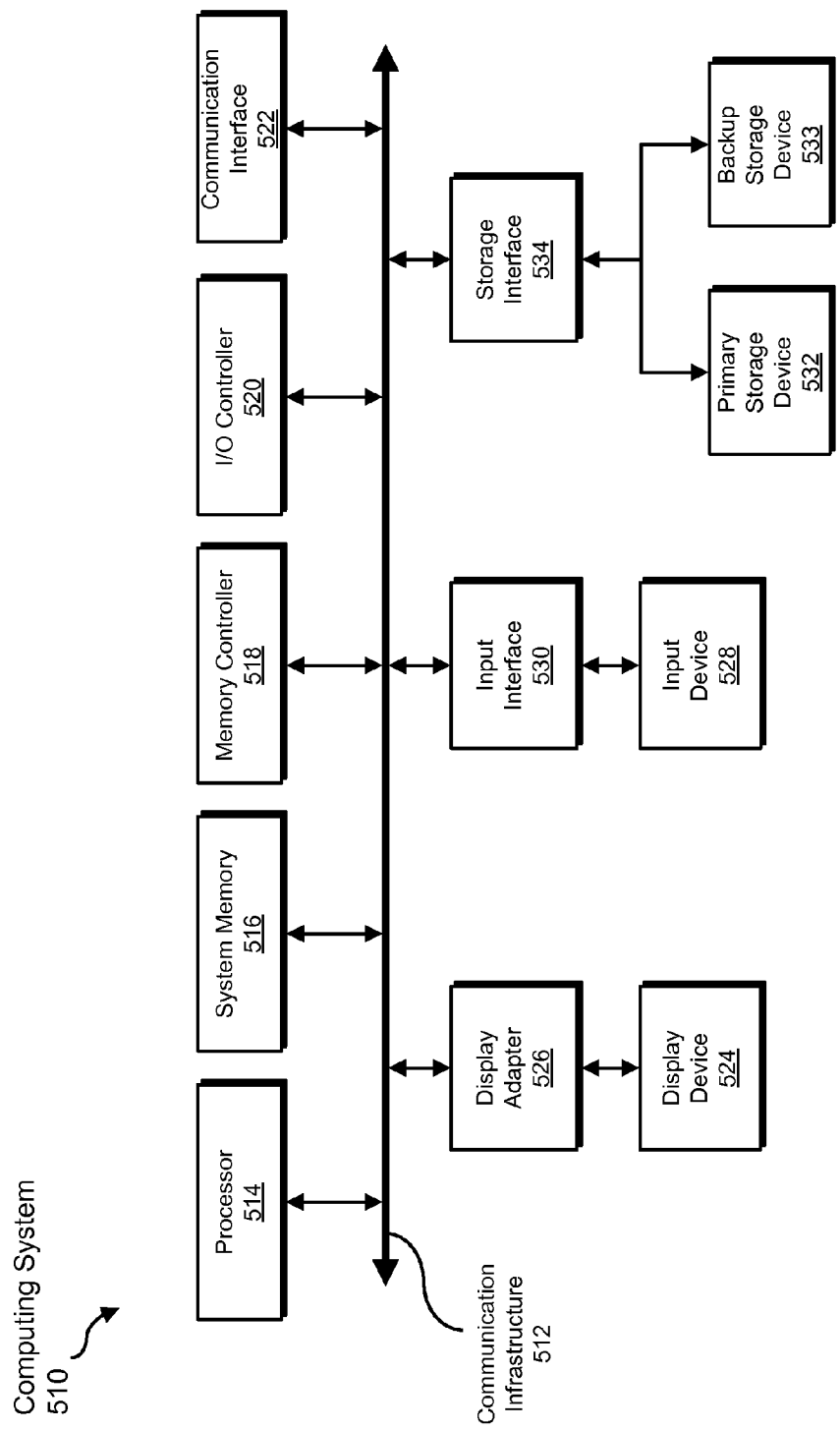
FIG. 5 is a block diagram of an exemplary computing system capable of implementing one or more of the embodiments described and/or illustrated herein.
Figure 6:
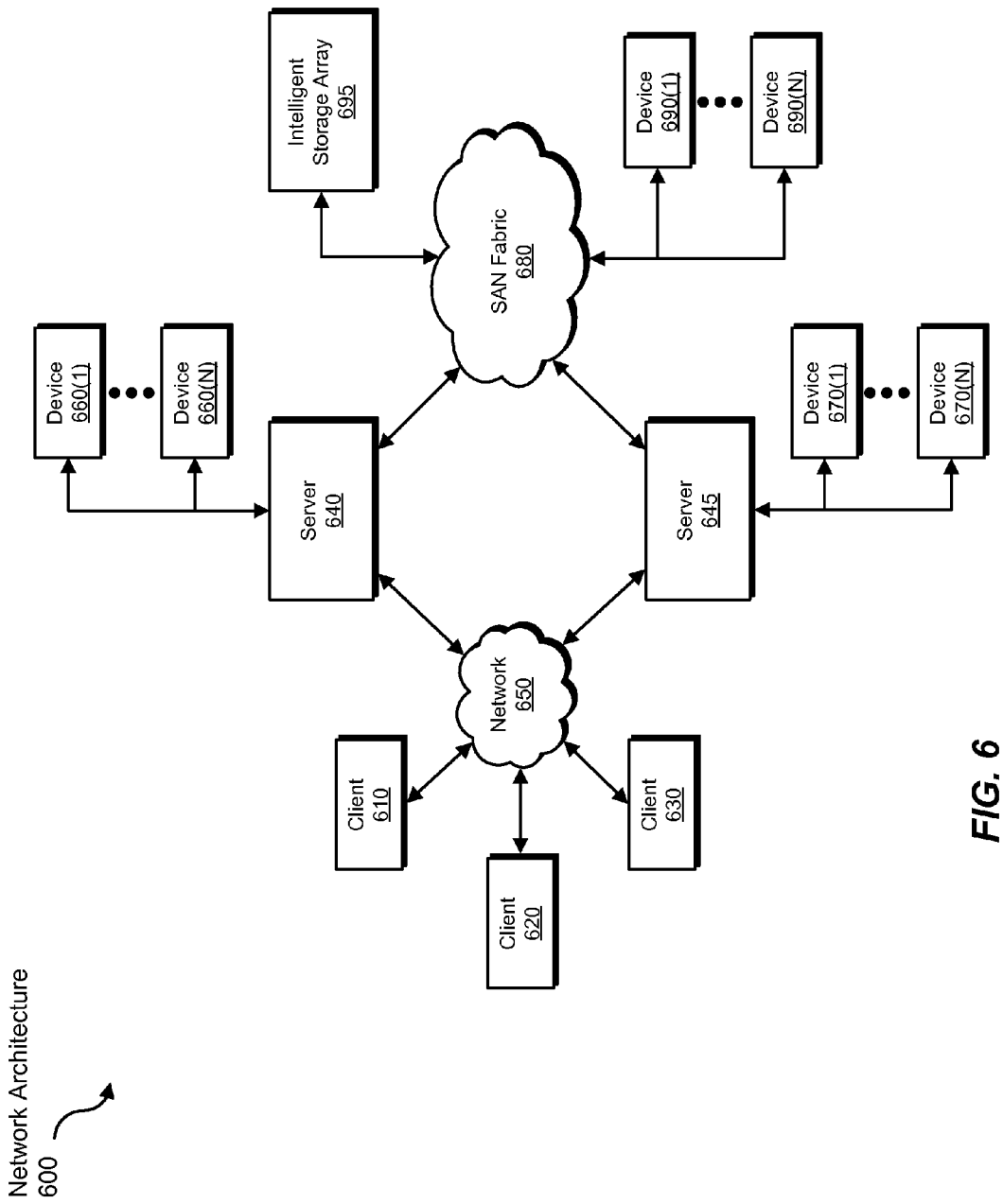
FIG. 6 is a block diagram of an exemplary computing network capable of implementing one or more of the embodiments described and/or illustrated herein.

FIG. 1 shows an exemplary system for creating and managing backups using virtual disks, FIGS. 2 and 3 show an exemplary method for accomplishing the same. FIG. 4 illustrates a timeline showing backup events, and FIGS. 5 and 6 illustrate an exemplary network and computing system for implementing embodiments of the instant disclosure.

FIG. 1 illustrates an exemplary backup system 100 for creating and managing backups using virtual disks. System 100 may include modules 110 and storage entities 120. Modules 110 may include a backup module 112 and a recovery module 114. Backup module 112 may be programmed to, at a first point in time, back up at least a portion of data-storage entity 122 to backup virtual-disk file 124. Backup module 112 may also be programmed to capture, in backup virtual-disk file 128, one or more changes made to the data in data-storage entity 122. Backup module 112 may also be programmed to create a parent-child relationship between backup virtual-disk file 124 and backup virtual-disk file 128, where backup virtual-disk file 124 is the parent of backup virtual-disk file 128. Backup module 112 may be further programmed to copy data stored in backup virtual-disk file 128 to backup virtual-disk file 124 so that backup virtual-disk file 124 contains the one or more changes made to data-storage entity 122. Recovery module 114 may be programmed to use an empty virtual-disk file 126 for retargeting and/or to boot a virtual machine from backup virtual-disk file 124.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 510 in FIG. 5 and/or portions of exemplary network architecture 600 in FIG. 6. One or more of modules 110 in FIG. 1 may also represent all or portions of one or more special-purpose computers configured to perform one or more of the tasks associated with steps disclosed herein.

As previously noted, system 100 may include storage entities 120. As used herein, the phrase "storage entity" may refer to any physical and/or logical storage entity. For example, a storage entity may include a volume, a physical disk, a virtual disk, a partition on a drive, a set of one or more data entities (e.g., files, blocks, clusters), and/or any other data storage area.

Storage entities 120 may include data-storage entity 122, a backup virtual-disk file 124, an empty virtual-disk file 126, a backup virtual-disk file 128, an empty virtual-disk file 130, a backup virtual-disk file 132, and an empty virtual-disk file 134. One or more of storage entities 120 in FIG. 1 may represent a portion of one or more computing devices. For example, one or more of storage entities 120 may represent a portion of one or more of computing system 510 in FIG. 5, and/or portions of exemplary network architecture 600 in FIG. 6. Alternatively, one or more of storage entities 120 in FIG. 1 may represent one or more physically separate devices capable of being accessed by a computing device, such as one or more of computing system 510 in FIG. 5, and/or portions of exemplary network architecture 600 in FIG. 6.

As used herein, the phrases "virtual disk" and "virtual-disk file" may refer to a disk that may appear to an operating system to be a physical disk. In some embodiments, virtual disks may be implemented using a disk emulator. A virtual disk may emulate any type of physical disk, such a hard drive, an optical disk, a network share, and/or any other physical storage entity.

A backup virtual-disk file may comprise a virtual-machine-disk-format file, a virtual-hard-disk file, or any other virtual-disk file format. An example of a virtual-machine-disk-format file is a VMWARE VIRTUAL-MACHINE-DISK-FORMAT file ("VMDK"). An example of a virtual-hard-disk file is a MICROSOFT VIRTUAL-HARD-DISK file ("VHD"). In certain embodiments, a backup virtual-disk file may include an incremental virtual-disk file. An incremental virtual-disk file may include any file that stores incremental changes. An incremental virtual-disk file may store an incremental backup. Examples of incremental virtual-disk files include MICROSOFT's UNDO file and VMWARE's REDO file.

FIG. 2 shows an exemplary method for creating and managing backups using virtual disks. The steps shown in FIG. 2 may be performed by any suitable computer executable code and/or computing system. In some embodiments, the steps shown in FIG. 2 may be performed by one or more of backup module 112 and/or recovery module 114. For example, at step 210 backup module 112 may, at a first point in time, back up at least a portion of data-storage entity 122 to backup virtual-disk file 124. Backup module 112 may back up at least a portion of data-storage entity 122 to virtual-disk file 124 in any suitable manner. Backing up at least a portion of the data-storage entity may include backing up one or more bytes from the data-storage entity, backing up one or more blocks from the data-storage entity, backing up one or more sectors from the data-storage entity, backing up one or more file-level elements (e.g., files, directories, etc.) stored in the data-storage entity, and/or backing up any other data unit stored in the data-storage entity.

Backup module 112 may backup any data stored in data-storage entity 122. Data may include any computer-readable (i.e. binary) information stored in data-storage entity 122. Examples of data include files (e.g., program files, registry files, hidden files, encrypted files, etc.), directories, system descriptions, boot sectors, partition layouts, file metadata, and system metadata. In some embodiments, data-storage entity 122 may comprise a volume. A volume may include any storage medium accessible by a single file system. Examples of a volume include a hard disk, an optical disk (e.g., DVD-ROM, CD-ROM, etc.), a flash memory drive, a floppy disk, a tape medium (e.g., DAT, DDS, LTO, or DLT), a partition on a hard disk, a RAID array, a storage area network ("SAN"), a network-attached storage ("NAS") device, or a virtual disk.

In some embodiments, backup virtual-disk file 124 may contain a full back up of data-storage entity 122. As used herein, the phrase "full backup" may refer to any data backup that includes each data unit (e.g., block, sector, cluster, file, etc.) in a set of data units. For example, a full backup of a volume may include each block in the volume. In some embodiments, a full backup may include only those clusters (blocks) that are currently allocated by the file system while skipping clusters that are not currently allocated by the file system. In some embodiments, a full backup may include only those files which have been identified for backup, which means that a full backup may include a subset of the data on a system or volume. In other embodiments, a full backup may include a copy of all data and/or software on a system. For example, a full backup may include an entire data store, regardless of whether or not that data has been changed since a previous backup was performed. A full backup may include all data needed for a complete system restoration. A full backup may be a starting point for other backups (e.g., incremental backups).

In other embodiments, backup virtual-disk file 124 may contain an incremental backup of data-storage entity 122. An incremental backup may include only changes made to data that has already been backed up. For example, an incremental backup may only include changes made to a data storage entity since a previous incremental or full backup. In some embodiments, an incremental backup may include data units for which an archive bit (or other backup indicator) is set.

At step 220, backup module 112 may capture, in backup virtual-disk file 128, at least one change made to data in data-storage entity 122 after the first point in time. Backup module 112 may capture the at least one change in any suitable manner. For example, backup module 112 may capture changes to one or more blocks stored in data-storage entity 122, changes to one or more sectors stored in data-storage entity 122, changes to one or more clusters stored in data-storage entity 122, and/or changes to one or more file-level elements stored in data-storage entity 122. The one or more changes captured after the first point in time may be referred to as a snapshot of data-storage entity 122. Backup module 112 may capture the at least one change as a full or incremental backup. In some embodiments, backup virtual-disk file 128 may comprise an incremental backup of data-storage entity 122. In other embodiments, backup virtual-disk file 128 may comprise a full backup of data-storage entity 122. In at least one embodiment, backup module 112 may monitor data-storage entity 122 and use a copy-on-write method to capture the at least one change by capturing every write made to data-storage entity 122.

Backup module 112 may capture the at least one change made to data in data-storage entity 122 at various intervals. For example, backup module 112 may capture changes to data-storage entity 122 once every minute, once every hour, once every day, or once every week. In other embodiments, backup module 112 may capture changes to data-storage entity 122 at irregular intervals. Backup module 112 may also provide continuous data protection by capturing every write made to data in data-storage entity 122 to a separate backup file.

At step 230, backup module 112 may create a parent-child relationship between backup virtual-disk file 124 and backup virtual-disk file 128, with backup virtual-disk file 124 being a parent of backup virtual-disk file 128. Backup module 112 may create and store the parent-child relationship in any suitable manner. A parent-child relationship between two virtual-disk files may indicate that the child virtual-disk file holds incremental changes made to data since the parent virtual-disk file was created.

At step 240, backup module 112 may copy data stored in backup virtual-disk file 128 to backup virtual-disk file 124 so that backup virtual-disk file 124 includes the at least one change made to data in data-storage entity 122 after the first point in time. As a result, virtual-disk file 124 may represent data-storage entity 122 at a second point in time. In embodiments where backup virtual-disk file 124 includes a full backup, backup virtual-disk file 124 may be referred to as a full synthetic backup of data-storage entity 122. As used herein, the phrase "full synthetic backup" may refer to a full backup taken at a first point in time that has been updated to include one or more changes made to a data-storage entity through a second point in time. Backup module 112 may transform backup virtual-disk file 124 into a full synthetic backup by copying data stored in backup virtual-disk file 128 to backup virtual-disk file 124.

Backup module 112 may begin copying data stored in backup virtual-disk file 128 to backup virtual-disk file 124 at various points during a backup process. In some embodiments, backup module 112 may begin copying data from backup virtual-disk file 128 to backup virtual-disk file 124 immediately after the data is captured in backup virtual-disk file 128. In other embodiments, backup module 112 may copy data from backup virtual-disk file 128 to backup virtual-disk file 124 at a predetermined point in time.

In some embodiments, backup module 112 may not begin copying data stored in backup virtual-disk file 128 to backup virtual-disk file 124 until the capturing of the at least one change is complete. That way, if the capturing fails, backup virtual-disk file 124 may be used as the last successful backup. If the capturing succeeds, backup virtual-disk file 128 may be used as the last successful backup. If backup module 112 begins to copy data stored in backup virtual-disk file 128 to backup virtual-disk file 124 before the capturing is complete and the capturing fails then backup virtual-disk files 124 and 128 may no longer be valid backups of data-storage entity 122.

FIG. 3 shows another exemplary method for creating and managing backups using virtual disks. The steps shown in FIG. 3 may be performed by any suitable computer executable code and/or computing system. In some embodiments, the steps shown in FIG. 3 may be performed by one or more of backup module 112 and/or recovery module 114. For example, at step 305 backup module 112 may, at a first point in time, back up at least a portion of data-storage entity 122 to backup virtual-disk file 124.

At step 310, backup module 112 may create empty virtual-disk file 126, which may be an incremental virtual-disk file. At step 315, backup module 112 may create a parent-child relationship between backup virtual-disk file 124 and empty virtual-disk file 126, with backup virtual-disk file 124 being a parent of empty virtual-disk file 126. In at least one embodiment, recovery module 114 may retarget empty virtual-disk file 126 to enable a virtual machine to boot from backup virtual-disk file 124. Retargeting empty virtual-disk file 126 may include any action that enables a virtual machine to boot from backup virtual-disk file 124. Examples of retargeting may include replacing, reconfiguring, and/or installing one or more of the Hardware Abstraction Layer ("HAL"), kernel, mass storage driver, and/or any other device drivers.

In certain embodiments, recovery module 114 may use empty virtual-disk file 126 to boot a virtual machine from backup virtual-disk file 124. The virtual machine may redirect future writes to empty virtual-disk file 126, allowing backup virtual-disk file 124 to remain unchanged. As long as backup virtual-disk file 124 remains unchanged, backup virtual-disk file 124 may be used as a base or parent for additional incremental backups.

At step 320, backup module 112 may capture, in backup virtual-disk file 128, at least one change made to data in data-storage entity 122 after the first point in time. At step 325, backup module 112 may create a parent-child relationship between backup virtual-disk file 124 and backup virtual-disk file 128, with backup virtual-disk file 124 being a parent of backup virtual-disk file 128.

At step 330, backup module 112 may create empty virtual-disk file 130. Then, at step 335, backup module 112 may create a parent-child relationship between backup virtual-disk file 128 and empty virtual-disk file 130, with backup virtual-disk file 128 being a parent of empty virtual-disk file 130. Recovery module 114 may retarget empty virtual-disk file 130 and/or use empty virtual-disk file 130 to boot a virtual machine from backup virtual-disk file 128.

At step 340, backup module 112 may copy data stored in backup virtual-disk file 128 to backup virtual-disk file 124 so that backup virtual-disk file 124 includes the at least one change made to data in data-storage entity 122 after the first point in time. After the data stored in backup virtual-disk file 128 is copied to backup virtual-disk file 124, backup virtual-disk file 124 may no longer be a valid parent of empty virtual-disk file 126. At the same time, backup virtual-disk file 128 may contain redundant information. Therefore at step 345, backup module 112 may modify the parent-child relationship of empty virtual-disk file 130 such that empty virtual-disk file 130 is a child of backup virtual-disk file 124 instead of being a child of backup virtual-disk file 128. At step 350, backup module 112 may delete backup virtual-disk file 128 and empty virtual-disk file 126.

FIG. 4 is a timeline showing backup events of an exemplary system for creating and managing backups using virtual disks. FIG. 4 shows timeline 400 containing point in time 410, point in time 412, and point in time 414. Point in time 410, point in time 412, and point in time 414 may refer to points in time from steps described and/or illustrated herein. In some embodiments, backup module 112 may, at point in time 410, backup at least a portion of data-storage entity 122 to backup virtual-disk file 124. Backup module 112 may then create empty virtual-disk file 126. Backup module 112 may associate empty virtual-disk file 126 with backup virtual-disk file 124 so that a virtual machine may boot backup virtual-disk file 124 and may access the at least a portion of data-storage entity 122 as it existed at point in time 410 without modifying virtual disk file 124.

At point in time 412, backup module 112 may capture, in backup virtual-disk file 128, at least one change made to data in data-storage entity 122. Backup module 112 may create a parent-child relationship between backup virtual-disk file 128 and backup virtual-disk file 124, with backup virtual-disk file 124 being a parent to backup virtual-disk file 128. Backup module 112 may also create empty virtual-disk file 130 and associate it with backup virtual-disk file 128. Empty virtual-disk file 130 may then be used to enable a virtual machine to boot from backup virtual-disk file 128. Therefore, the virtual machine may access the at least a portion of data-storage entity 122 as it existed at point in time 412.

Backup module 112 may continue to make any number of additional backups of data-storage entity 122 in a similar manner. For example, backup module 112 may capture, in backup virtual-disk file 132, at least one change made to data in data-storage entity 122 at point in time 414. In some embodiments, the at least one change may include only the changes made to data in data-storage entity 122 since point in time 412. In certain embodiments, backup module 112 may create a parent-child relationship between backup virtual-disk file 132 and backup virtual-disk file 128, with backup virtual-disk file 128 being a parent to backup virtual-disk file 132. Backup module 112 may also create empty virtual-disk file 134 and associate it with backup virtual-disk file 132. Empty virtual-disk file 134 may then be used to enable a virtual machine to boot from backup virtual-disk file 132. Therefore, a virtual machine may access the data stored in data-storage entity 122 as it existed at point in time 414.

After point in time 414, backup module 112 may roll the data in backup virtual-disk file 132 into backup virtual-disk file 128. After the data is copied from backup virtual-disk file 132 to backup virtual-disk file 128, backup module 112 may update the parent-child relationship between backup virtual-disk file 132 and empty virtual-disk file 134 such that backup virtual-disk file 128 is the parent of empty virtual-disk file 134. Backup module 112 may then delete backup virtual-disk file 132 and empty virtual-disk file 130. At this point, backup virtual-disk file 128 may be accessible as a backup that represents a state of data-storage entity 122 at point in time 414.

Backup module 112 may also roll the data in backup virtual-disk file 128 into backup virtual-disk file 124. After the data is copied, backup module 112 may update the parent-child relationship between backup virtual-disk file 124 and empty virtual-disk file 126 such that backup virtual-disk file 124 is the parent of empty virtual-disk file 134. Backup module 112 may then delete backup virtual-disk file 128 and empty virtual-disk file 126. At this point, backup virtual-disk file 124 may be accessible as a backup that represents a state of data-storage entity 122 at point in time 414. If backup module 112 were to copy the data from virtual-disk file 128 to virtual-disk file 124, without having previously copied the data in virtual-disk file 132 into virtual-disk file 128, then before deleting virtual-disk file 128, it would also need to update virtual-disk file 132 so that virtual-disk file 132's parent becomes virtual-disk file 124. Similarly, if virtual-disk file 128 is copied back into virtual-disk file 124 before virtual-disk file 132 is created, then virtual-disk file 132 would be created with virtual-disk file 124 as its parent.

In some embodiments, backup module 112 may, when creating parent-child relationships, define backup virtual-disk file 124 as the parent of every backup virtual-disk file created after point in time 410. These additional backup virtual-disk files may be referred to as differential backups.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the backing up, capturing, creating, copying, retargeting, using, modifying, and deleting steps described herein.

Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as backing up, capturing, creating, copying, retargeting, using, modifying, and deleting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for backing up, capturing, creating, copying, retargeting, using, modifying, and deleting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the backing up, capturing, creating, copying, retargeting, using, modifying, and deleting steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the backing up, capturing, creating, copying, retargeting, using, modifying, and deleting steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the identifying, backing up, capturing, creating, copying, retargeting, using, modifying, and deleting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the backing up, capturing, creating, copying, retargeting, using, modifying, and deleting steps disclosed herein. Network architecture 600 may also be used to perform and/or be a means for performing other steps and features set forth in the instant disclosure.

As detailed above, computing system 510 and/or one or more of components of network architecture 600 may perform and/or be a means of performing, either alone or in combination with other elements, one or more steps of the exemplary methods described and/or illustrated herein. For example, a computing system (e.g., computing system 510 and/or one or more of the components of network architecture 600) may perform a computer-implemented method for creating and managing backups using virtual disks. For example, the computing system may at a first point in time, back up at least a portion of a data-storage entity to a first virtual-disk file. The computing system may capture, in a second virtual-disk file, at least one change made to data in the data-storage entity after the first point in time.

The computing system may also create a parent-child relationship between the first virtual-disk file and the second virtual-disk file, with the first virtual-disk file being a parent of the second virtual-disk file. The computing system may further copy data stored in the second virtual-disk file to the first virtual-disk file so that the first virtual-disk file includes the at least one change made to data in the data-storage entity after the first point in time. In some embodiments, the first virtual-disk file may include a full backup of the data-storage entity, and the second virtual-disk file may include an incremental backup of the data-storage entity. In other embodiments, the first virtual-disk file may include a first incremental backup of the data-storage entity. The second virtual-disk file may include a second incremental backup of the data-storage entity.

In various embodiments, the computing system may create a first empty virtual-disk file. The computing system may create a parent-child relationship between the first virtual-disk file and the first empty virtual-disk file, with the first virtual-disk file being a parent of the first empty virtual-disk file. In some embodiments, the computing system may retarget the first empty virtual-disk file to enable a virtual machine to boot from the first virtual-disk file. In at least one embodiment, the computing system may use the first empty virtual-disk file to boot a virtual machine from the first virtual-disk file.

In some embodiments, the computing system may create a second empty virtual-disk file. The computing system may also create a parent-child relationship between the second virtual-disk file and the second empty virtual-disk file, the second virtual-disk file being a parent of the second empty virtual-disk file. The computing system may, after copying data stored in the second virtual-disk file to the first virtual-disk file, modify the parent-child relationship of the second empty virtual-disk file such that the second empty virtual-disk file is a child of the first virtual-disk file instead being a child of the second virtual-disk file.

In various embodiments, the computing system may, after copying data stored in the second virtual-disk file to the first virtual-disk file, delete the second virtual-disk file and the first empty virtual-disk file. In other embodiments, the computing system may be triggered, by the completion of the capturing at least one change made to data in the data-storage entity, to copy the data stored in the second virtual-disk file to the first virtual-disk file. In some embodiments the virtual-disk file may include a virtual-machine-disk-format ("VMDK") file or a virtual-hard-disk ("VHD") file. In at least one embodiment, the data-storage entity may comprise a volume.

In some embodiments, the computing system may include a backup module. The backup module may, at a first point in time, back up at least a portion of a data-storage entity to a first virtual-disk file. The backup module may capture, in a second virtual-disk file, at least one change made to data in the data-storage entity after the first point in time. The backup module may also create a parent-child relationship between the first virtual-disk file and the second virtual-disk file, the first virtual-disk file being a parent of the second virtual-disk file. The backup module may further copy data stored in the second virtual-disk file to the first virtual-disk file so that the first virtual-disk file includes the at least one change made to data in the data-storage entity after the first point in time. The computing system may include a storage device in communication with the backup module. The storage device may store the first virtual-disk file and/or the second virtual-disk file. The computing system may also include a processor configured to execute the backup module.

In some embodiments, the first virtual-disk file may comprise a full backup of the data-storage entity. The second virtual-disk file may comprise an incremental backup of the data-storage entity. In other embodiments, the first virtual-disk file may comprise a first incremental backup of the data-storage entity, and the second virtual-disk file may comprise a second incremental backup of the data-storage entity. In various embodiments, the backup module may create a first empty virtual-disk file. The backup module may also create a parent-child relationship between the first virtual-disk file and the first empty virtual-disk file, with the first virtual-disk file being a parent of the first empty virtual-disk file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method for backing up data, at least a portion of the method being performed by a computing system comprising at least one processor, the method comprising:
    at a first point in time, backing up at least a portion of a data-storage entity to a first virtual-disk file;
    capturing, in a second virtual-disk file, at least one change made to data in the data-storage entity after the first point in time;
    creating a parent-child relationship between the first virtual-disk file and the second virtual-disk file, the first virtual-disk file being a parent of the second virtual-disk file;
    copying data stored in the second virtual-disk file to the first virtual-disk file so that the first virtual-disk file comprises a synthetic backup that includes the at least one change made to data in the data-storage entity after the first point in time;
    storing the first virtual-disk file that comprises the synthetic backup in a manner that enables at least one virtual machine to boot from the stored first virtual-disk file;
    creating a first empty virtual-disk file;
    creating a parent-child relationship between the first virtual-disk file and the first empty virtual-disk file, the first virtual-disk file being a parent of the first empty virtual-disk file;
    retargeting the first empty virtual-disk file to provide a first retargeted virtual-disk file and to enable the at least one virtual machine to boot from the first virtual-disk file.

2. The computer-implemented method of claim 1, wherein:
    the first virtual-disk file comprises a full backup of the data-storage entity;
    the second virtual-disk file comprises an incremental backup of the data-storage entity.

3. The computer-implemented method of claim 1, wherein:
    the first virtual-disk file comprises a first incremental backup of the data-storage entity;
    the second virtual-disk file comprises a second incremental backup of the data-storage entity.

4. The computer-implemented method of claim 1, further comprising using the first retargeted virtual-disk file to boot the at least one virtual machine from the first virtual-disk file.

5. The computer-implemented method of claim 1, further comprising:
    creating a second empty virtual-disk file;
    creating a parent-child relationship between the second virtual-disk file and the second empty virtual-disk file, the second virtual-disk file being a parent of the second empty virtual-disk file;
    after copying data stored in the second virtual-disk file to the first virtual-disk file, modifying the parent-child relationship of the second empty virtual-disk file such that the second empty virtual-disk file is a child of the first virtual-disk file instead being a child of the second virtual-disk file.

6. The computer-implemented method of claim 5, further comprising:
    after copying data stored in the second virtual-disk file to the first virtual-disk file, deleting the second virtual-disk file and the first retargeted virtual-disk file.

7. The computer-implemented method of claim 1, wherein completion of the capturing at least one change made to data in the data-storage entity triggers the copying of data stored in the second virtual-disk file to the first virtual-disk file.

8. The computer-implemented method of claim 1, wherein the first and second virtual-disks file comprise at least one of a:
    virtual-machine-disk-format file;
    virtual-hard-disk file.

9. The computer-implemented method of claim 1, wherein the data-storage entity comprises a volume.

10. The computer-implemented method of claim 1, wherein copying the data stored in the second virtual-disk file to the first virtual-disk file comprises copying data stored in the second virtual-disk file to the first virtual disk file so that the first virtual-disk file comprises a synthetic full backup that represents the data-storage entity at the time the change was captured in the second virtual-disk file.

11. The computer-implemented method of claim 1, wherein storing the first virtual-disk file comprises enabling the at least one virtual machine to boot from the stored first virtual-disk file without converting the synthetic backup from a different file format to a virtual-disk file.

12. A system comprising:
    a backup module programmed to:
        at a first point in time, back up at least a portion of a data-storage entity to a first virtual-disk file;
        capture, in a second virtual-disk file, at least one change made to data in the data-storage entity after the first point in time;
        create a parent-child relationship between the first virtual-disk file and the second virtual-disk file, the first virtual-disk file being a parent of the second virtual-disk file;
        copy data stored in the second virtual-disk file to the first virtual-disk file so that the first virtual-disk file comprises a synthetic backup that includes the at least one change made to data in the data-storage entity after the first point in time;
        store the first virtual-disk file that comprises the synthetic backup in a manner that enables at least one virtual machine to boot from the stored first virtual-disk file;
        create a first empty virtual-disk file;
        create a parent-child relationship between the first virtual-disk file and the first empty virtual-disk file, the first virtual-disk file being a parent of the first empty virtual-disk file;
        retarget the first empty virtual-disk file to provide a first retargeted virtual-disk file and to enable the at least one virtual machine to boot from the first virtual-disk file;
    a storage device in communication with the backup module and configured to store at least one of:
        the first virtual-disk file;
        the second virtual-disk file;
    a processor configured to execute the backup module.

13. The system of claim 12, wherein the backup module is programmed to:
- create a second empty virtual-disk file;
- create a parent-child relationship between the second virtual-disk file and the second empty virtual-disk file, the second virtual-disk file being a parent of the second empty virtual-disk file;
- after copying data stored in the second virtual-disk file to the first virtual-disk file, modify the parent-child relationship of the second empty virtual-disk file such that the second empty virtual-disk file is a child of the first virtual-disk file instead of being a child of the second virtual-disk file.

14. A non-transitory computer-readable medium comprising one or more computer-executable instructions that, when executed by a computing device, cause the computing device to:
- at a first point in time, back up at least a portion of a data-storage entity to a first virtual-disk file;
- capture, in a second virtual-disk file, at least one change made to data in the data-storage entity after the first point in time;
- create a parent-child relationship between the first virtual-disk file and the second virtual-disk file, the first virtual-disk file being a parent of the second virtual-disk file;
- copy data stored in the second virtual-disk file to the first virtual-disk file so that the first virtual-disk file comprises a synthetic backup that includes the at least one change made to data in the data-storage entity after the first point in time;
- store the first virtual-disk file that comprises the synthetic backup in a manner that enables at least one virtual machine to boot from the stored first virtual-disk file;
- create a first empty virtual-disk file;
- create a parent-child relationship between the first virtual-disk file and the first empty virtual-disk file, the first virtual-disk file being a parent of the first empty virtual-disk file;
- retarget the first empty virtual-disk file to provide a first retargeted virtual-disk file and to enable the at least one virtual machine to boot from the first virtual-disk file.

* * * * *